United States Patent
Arumugam

(10) Patent No.: US 10,521,286 B2
(45) Date of Patent: Dec. 31, 2019

(54) SYSTEM AND METHOD FOR INTEROPERABLE CLOUD DSL TO ORCHESTRATE MULTIPLE CLOUD PLATFORMS AND SERVICES

(71) Applicant: Rathinasabapathy Arumugam, Chennai (IN)

(72) Inventor: Rathinasabapathy Arumugam, Chennai (IN)

(*) Notice: Subject to any disclaimer, the term of this patent is extended or adjusted under 35 U.S.C. 154(b) by 60 days.

(21) Appl. No.: 15/686,160

(22) Filed: Aug. 25, 2017

(65) Prior Publication Data

US 2018/0276060 A1    Sep. 27, 2018

Related U.S. Application Data

(60) Provisional application No. 62/475,671, filed on Mar. 23, 2017.

(51) Int. Cl.
| | | |
|---|---|---|
| G06F 3/00 | (2006.01) | |
| G06F 9/54 | (2006.01) | |
| H04L 29/08 | (2006.01) | |
| H04L 12/24 | (2006.01) | |
| G06F 9/50 | (2006.01) | |

(52) U.S. Cl.
CPC .......... *G06F 9/547* (2013.01); *G06F 9/5072* (2013.01); *G06F 9/54* (2013.01); *H04L 41/0893* (2013.01); *H04L 67/10* (2013.01)

(58) Field of Classification Search
CPC ........................................................ G06F 9/54
USPC ........................................................ 719/310
See application file for complete search history.

(56) References Cited

U.S. PATENT DOCUMENTS

| | | | | |
|---|---|---|---|---|
| 2014/0123116 A1* | 5/2014 | Smiljanic | ............ | G06F 11/3664 717/130 |
| 2014/0189548 A1* | 7/2014 | Werner | ................ | G06F 3/0481 715/762 |
| 2014/0195306 A1* | 7/2014 | Bernelas | ............ | G06Q 10/0637 705/7.36 |
| 2016/0065499 A1* | 3/2016 | Holmes | ................ | H04L 47/785 709/226 |

OTHER PUBLICATIONS

H. Conrad Cunningham, A Little Language for Surveys: Constructing an Internal DSL in Ruby. (Year: 2008).*

* cited by examiner

*Primary Examiner* — Lechi Truong

(57) ABSTRACT

In one aspect, a computerized method utilizing an interoperable cloud Domain-specific language (DSL) to orchestrate multiple cloud platforms and services including the step of parsing one or more DSL inputs. The computerized method includes the step of validating one or more DSL inputs a content and a syntax based on a DSL type and a type of associated cloud platform. The computerized method includes the step of chaining the one or more DSL to orchestrate resources in various cloud platforms by using cloud-platform native DSL and with orchestrating operational tools using third party custom DSLs. The computerized method includes the step of parsing an input data structure from the one or more DSLs together. The computerized method includes the step of appending the input data structure from the one or more DSLs together to capture input values together for execution.

9 Claims, 8 Drawing Sheets

```
parameters:
  availability_zone:
    default: nova
    description: "The Availability Zone to launch the instance."
    type: string
  image_id:
    description: "ID of the image to use for the instance to be created."
    type: string
  instance_type:
    constraints:
      allowed_values:
        - m1.small
        - m1.medium
        - m1.large
      description: "Value must be one of 'm1.small', 'm1.medium' or 'm1.large'."
    default: m1.small
    description: "Type of the instance to be created."
    type: string
  key_name:
    description: "Name of an existing key pair to enable SSH access to the instance."
    type: string
  network_id_input:
    description: "ID of the private network."
    type: string
```

SYSTEM AND METHOD FOR INTEROPERABLE CLOUD DSL TO ORCHESTRATE MULTIPLE CLOUD PLATFORMS AND SERVICES

CROSS-REFERENCE TO RELATED APPLICATIONS

This application is a claims priority, to U.S. provisional patent application No. 62/475,671, titled METHODS AND SYSTEMS OF A CLOUD GOVERNANCE PLATFORM AND A CONVERGED ORCHESTRATION FRAMEWORK and filed on 23 Mar. 2017. This provisional application is hereby incorporated by reference in its entirety.

BACKGROUND

The various Cloud Services (e.g. IaaS, SaaS, PaaS) and/or Operational Tools (e.g. Monitoring, Logging, Security, Configuration Management etc.) are increasingly programmable. These programmable Cloud services exposes APIs (Application Programming Interface) that can be programmed through any languages such as Java/Python/Node.Js/C# etc. The resources and its related action(s) on the services can be automated by consuming or programming the API. To achieve a desired result efficiently and effectively, these services need to be orchestrated more than automated as it involves coordination of lower level action on multiple resources and/or components to provide a desired result. There are multiple Domain Specific languages (DSLs) and/or templates or declarative definitions started coming up to Orchestrate Cloud platforms and Services. DSLs can be human readable and machine understandable declarative structure represented in YAML/BON/YAQL. DSLs can be executed by respective platform or engine. Cloud platform and/or service providers can provide their native DSLs for orchestrating group of resources to meet the provisioning requirements of infrastructure and application Cloud native DSLs typically orchestrate actions such as, inter alia: provisioning, application deployment, scaling policies of Cloud resources (e.g. virtual machines, virtual networks, data storage, applications deployments, etc.) to manage them as group or stack in its platform. Cloud resources and related components can be managed as a group and/or stack instead of separate entities as they are related and interdependent parts of a single workload. The group and/or stack provisioned by Cloud native DSLs may be mutable. Though there are lot of advantages of using Cloud native DSLs, it has the following limitation, inter alia: i) Does not support discrete actions on the resources; ii) Does not support Schedules and Workflows; iii) Does not support Orchestration-of-On premise infrastructure; iv) Supports orchestration of resources and services only in their own platform; etc. Accordingly, a system and method for interoperable cloud DSL to orchestrate multiple Cloud platforms and services provide means to overcome the above limitation.

SUMMARY OF THE INVENTION

In one aspect, a computerized method utilizing an interoperable cloud Domain-specific language (DSL) to orchestrate multiple cloud platforms and services including the step of parsing one or more DSL inputs. The computerized method includes the step of validating one or more DSL inputs a content and a syntax based on a DSL type and a type of associated cloud platform. The computerized method includes the step of chaining the one or more DSL to orchestrate resources in various cloud platforms by using cloud-platform native DSL and with orchestrating operational tools using third party custom DSLs. The computerized method includes the step of parsing an input data structure from the one or more DSLs together. The computerized method includes the step of appending the input data structure from the one or more DSLs together to capture input values together for execution.

BRIEF DESCRIPTION OF THE DRAWINGS

FIG. 8 illustrates an example input data structure, according to some embodiments.

Figure 1:
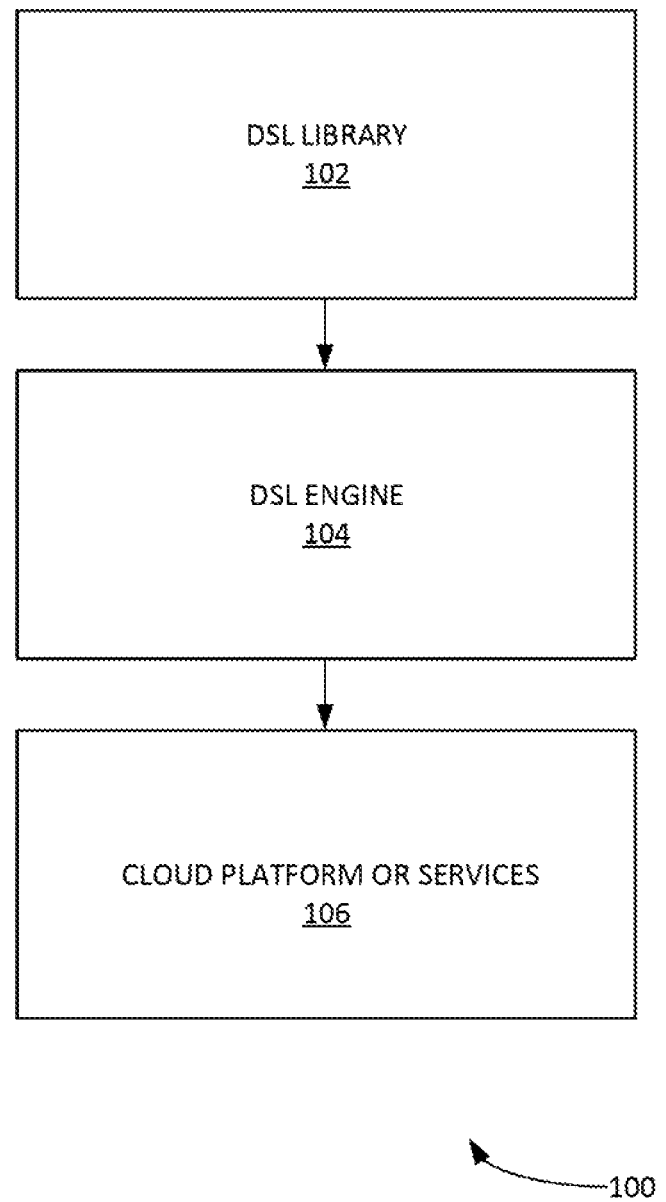
FIG. 1 illustrates an example system for interoperable cloud DSL to r orchestrate multiple cloud platforms and services, according to some embodiments.

The Figures described above are, a representative set, and are not an exhaustive with respect to embodying the invention.

DESCRIPTION

Disclosed are a system, method, and article of manufacture for methods and systems for interoperable cloud DSL to orchestrate multiple cloud platforms and services. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features structures, r characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize; however, that the invention may be practiced without one or more of the specific details, or with other methods, components, materials, and so forth in other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Cloud computing can involve deploying groups of remote servers and/or software networks that allow centralized data storage and online access to computer services or resources. These groups of remote serves and/or software networks can be a collection of remote computing services.

Domain-specific language (DSL) is a computer language specialized to a specified application domain. Example DSL can include, inter alia: a Game Maker Language; Unix shell scripts for data organization; ColdFusion Markup Language; Erlang OTP; FilterMeister; MediaWiki templates; Software engineering uses; Metacompilers; Rules Engines for Policy Automation; Statistical modelling languages; Generate model and services to multiple programming Languages; etc.

Orchestration is the automated arrangement, coordination, and management of computer systems, middleware, and services.

Platform as a service (PaaS) can, be a category of cloud computing services that provides a platform allowing customers to develop, run, and manage applications without the complexity of building and maintaining the infrastructure typically associated with developing and launching an application.

Software as a service (SaaS) can be a software licensing and delivery model in which software is licensed on a subscription basis and is centrally hosted.

Example Computing Systems

FIG. 1 illustrates an example system 100 for interoperable cloud DSL to orchestrate multiple cloud platforms and services, according to some embodiments. System 100 can be used to interoperate DSLs to orchestrate multiple Cloud platforms and services by using cloud platform native DSLs and/or other third-party DSLs. System 100 can improve the efficiency, reusability and coverage of orchestration. DSLs can be a collection of tasks executed in an orderly fashion against specific cloud platforms. System 100 can execute various DSLs in an orderly fashion asynchronously by interoperating DSLs to perform actions against various cloud platforms and services in their own supported DSLs along with orchestrating operational tools using third party custom DSLs. System 100 can outline a DSL parser (e.g. DSL parser 504 discussed infra, etc.). DSL parser can understand the contents of the DSLs based on its type. DSL parser can perform a pre-processing of the DSLs to capture the inputs required for processing based on the platform selected and execute them in the respective cloud platform or services.

It is noted that various clouds-service providers may have their own DSL(s) for orchestration. System 100 can interoperate DSLs. System 100 can chain multiple DSLs and thus orchestrate resources in multiple cloud platforms. For example, system 100 can utilized its own DSL and/or one or more orchestrating operational tool(s) using third party custom DSLs. System 100 can interoperate DSLs utilizing the anatomy of DSL/Templates. DSLs/Templates anatomy can include three sections such as, inter alia: an input section, a resource section and an output section. The input section defines the parameters and/or attributes used for performing actions on the resources, characteristics and/or constraint of the input attributes. The resource section defines various actions on the resources. The resource section can define its dependencies on other resources. It is noted that an input section defines the parameters and/or attributes used for performing actions on the resources, characteristics and/or constraint of the input attributes. The values for the input parameters and/or attributes can be captured during the execution. Some of the DSLs enable the definition of properties/characteristics for input parameters or attributes such as data type, allowedpattern, allowedvalues, constraint, default, description, maxlength, maxvalue, minlength, minvalue, array, securedstring etc. The output section defines the output parameters that are resulted through the resource actions. The DSL interoperation can be achieved by having a DSL Parser (e.g. DSL parser 504) which parses the DSL Content using a dictionary and a pre-processor process the input of the DSL to be executed through a common DSL Executor (e.g. DSL Executor 508, etc.). The interoperation of the DSLs implemented by system 100 can be implemented in a structured way such that it can be extensible to any DSLs.

DSL library 102 can be a repository that stores various types of DSLs and/or templates. DSL library 102 can also store corresponding metadata. DSL library 102 can manage various DSLs. DSL library 102 can chain DSLs. DSL library 102 can define a common input structure for DSLs. This can be implemented when DSL library 102 does not support definition of input characteristics and/or the user require to standardize the input for DSLs. DSL library 102 can define its own input structure. DSL library 102 can define new input characteristics and constraints. DSL library 102 can connect the input characteristics with a resource-discovery process.

DSL chaining is now discussed. DSLs available in the DSL library with various types, supporting various Cloud Service Providers and Tools can be chained together to form a DSL blueprint. While Chaining the DSL, the input of all the DSLs are parsed based on the DSL type to consolidate the input capture, output is streamlined with a Schema which is understandable by the Subsequent DSLs based on the Service Dictionary. The output definition in the schema is injected with a Standard schema as per the Resource based on the service dictionary. The DSL Supporting the service and its action for each resource in the service are maintained in the service dictionary. While chaining the DSL, the execution type (e.g. on demand or scheduled) and conditions are defined for each of the DSLs. The execution condition can be based on policy, workflow, events or alarms.

An example resource-discovery process is now discussed. Cloud Services provides various resources such as compute, network, storage, etc. The resource-discovery process can obtain the list of these resources by calling a respective API. The resource-discovery process can be a schema-driven structure used to obtain the list of resources dynamically along with its hierarchy as defined in the schema. The resource-discovery process can be enabled in the DSL through a declarative definition for each resource. The declarative definition points to a resource discovery endpoint with parameter for a resource which is defined in the schema and discover the resources from the cloud during the pre-execute process for orchestration.

DSL engine 104 can include a DSL pre-parser, DSL processor, service dictionary, and a DSL executor. DSL engine 104 can perform DSI interoperation. The DSL interoperation can be achieved by having a DSL Parser which parses the DSL Content using a dictionary and a pre-processor process the input of the DSL to be executed through a common DSL Executor. The interoperation of the DSLs implemented by system 100 can be implemented in a structured way such that it can be extensible to any DSLs.

Figure 2:
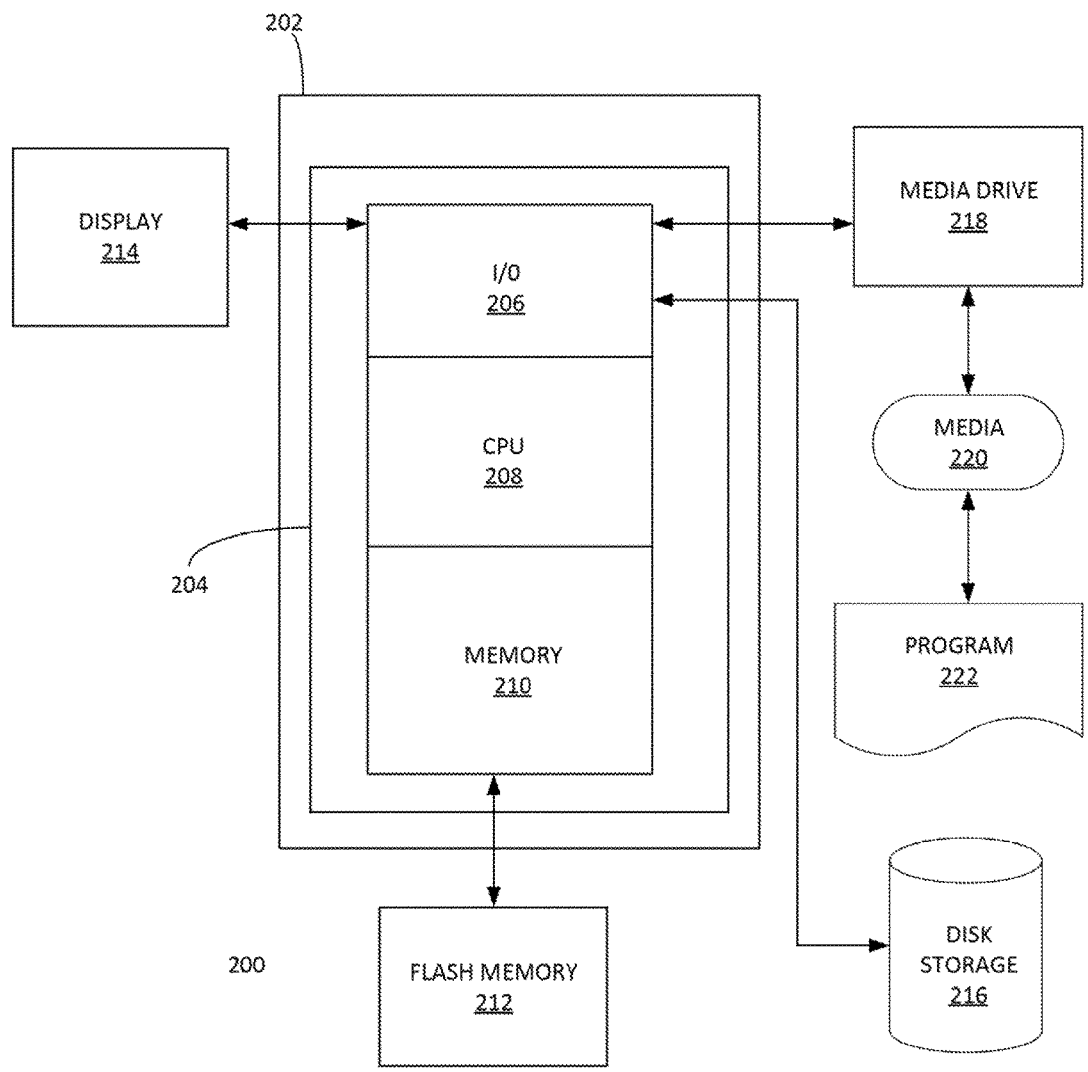
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 205, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be, configured to include additional systems in order to fulfill various functionalities Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 3:
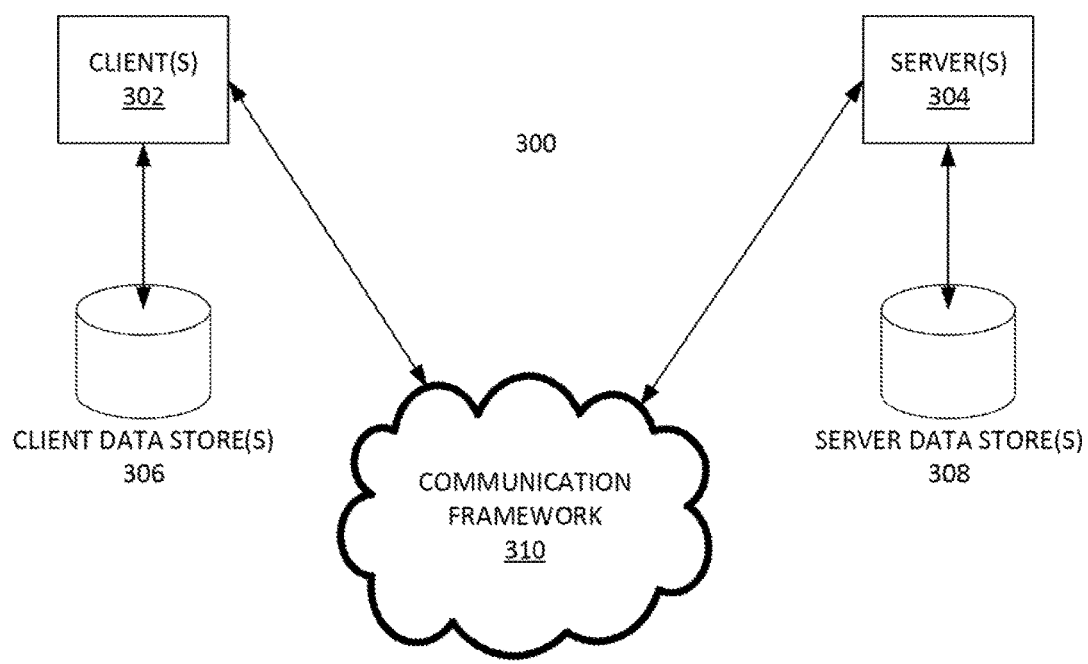
FIG. 3 is a block diagram of a sample computing environment that an be utilized to implement various embodiments.

FIG. 3 is a block diagram of a sample computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a orchestration framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform.

Figure 4:
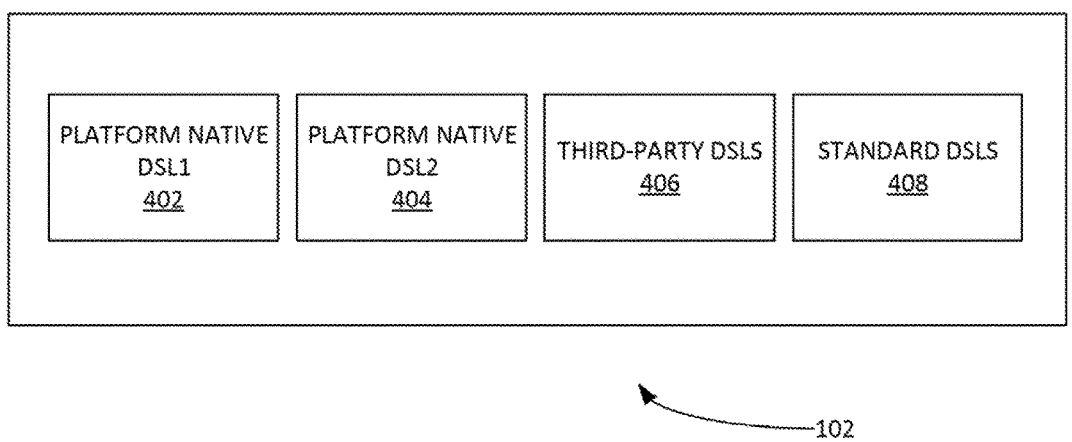
FIG. 4 illustrates an example DSL library, according to some embodiments.

FIG. 4 illustrates an example DSL library 102, according to some embodiments. As noted supra, DSL library 102 can be a repository that stores various types of DSLs and/or templates, DSL library 102 can also store corresponding metadata. DSL library 102 can include platform native DSL1 402, platform native DSL2 404, third-party DS 404 and/or standard DSL 406. There are various Cloud Service providers available in the market. Some of the leading Cloud Service providers are, inter alia: Amazon Web Services (AWS)®, Microsoft Azure®, Google Compute Engine®, IBM Bluemix®, Oracle Cloud®, Rackspace®, Centurylink®, etc. Some of the Cloud native DSLs are Cloudformation® by AWS®, Azure Resource Manager® by Microsoft Azure®, Runner® by Centurylink®, Cloud Deployment Manager® by Google®, Oracle Orchestration Cloud® by Oracle®. Some of the third-party DSLs can provide Cloud Orchestrations are Terraform by Hashicorp®, Ansible® by Redhat®, HEAT® by Openstack® Community, Mistral® by Openstack Community®. Some of the standard which are emerging for Cloud Orchestration are Topology and Orchestration Specification for Cloud Applications (TOSCA) and Cloud Application Management for Platforms (CAMP).

Figure 5:
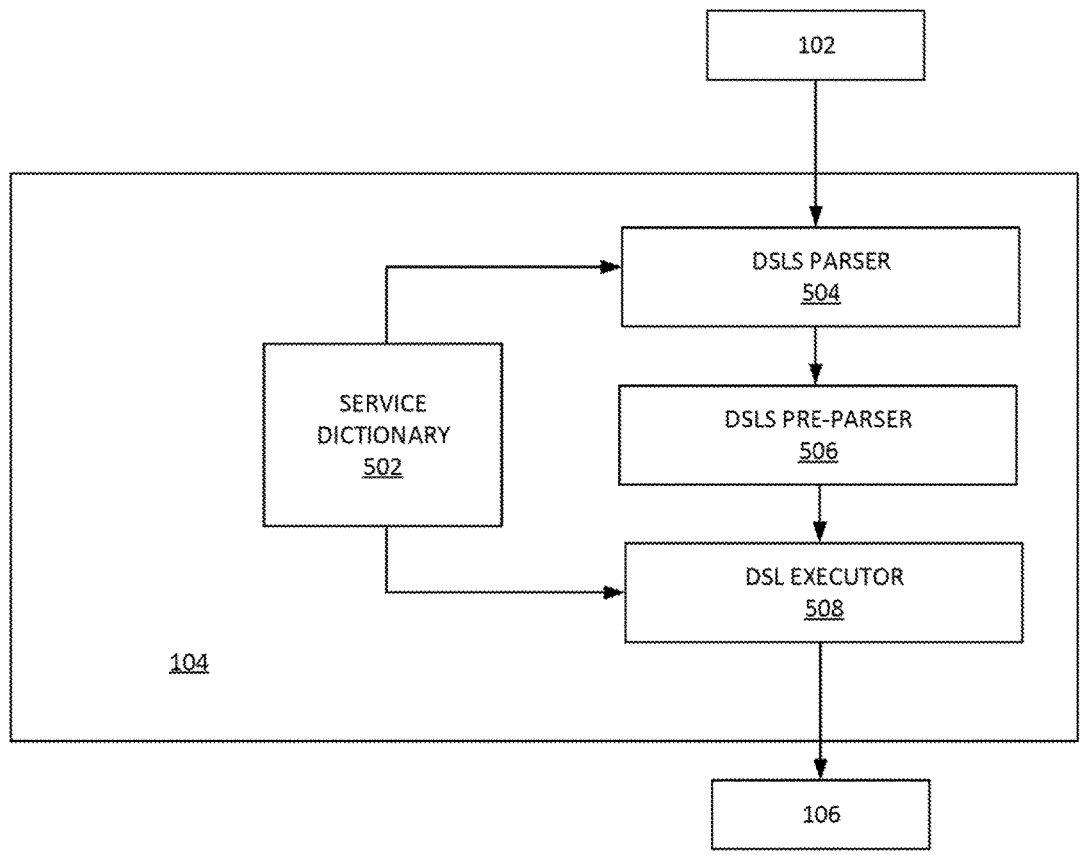
FIG. 5 illustrates an example DSL engine, according to some embodiments.

FIG. 5 illustrates an example DSL engine 104, according to some embodiments. DSL parser 504 parses the content of the DSLs. DSL parser 504 validates its syntax and actions based on its type and cloud-platform type. DSL parser 504 performs the DSL validation using the service dictionary 502. DSL parser 504 performs cloud-platform validation using a native validation method. DSL can be validated far format, syntax, cloud support and resource actions defined. The metadata defined for the DSL and the content of the DSL are validated against the service dictionary schema which has details of the cloud support, resource action support for the selected Engine and Cloud. DSL parser 504 also separates three sections (e.g. an input section, a resource section and an output section) of DSLs and feeds the input, section to DSL Pre-processor 506. The input section defines the parameters and/or attributes used for performing actions on the resources, characteristics and/or constraint of the input attributes. The resource section defines various actions on the resources. The resource section can define its dependencies on other resources. The output section defines the output parameters that are resulted through the resource actions.

DSL Pre-processor 506 builds the input structure by understanding syntax of various DSLs and appending the input to capture input values in a single iteration.

Service dictionary 502 is a repository that manages the various details of the service (e.g. cloud platform, cloud services, tools, etc.). Example service details can include, inter alia: hierarchy, category, end points, component groups, component identity, resources, supported actions for the resources, DSL syntax for the actions, input and output attribute structure for actions, dependencies and discovery mode for the resource, etc. Various service dictionary embodiments are now provided. A service dictionary can be a schema which allows to manage various details of the service (e.g. cloud platform and services) including its hierarchy, category, security definitions, capabilities, end points, component groups, component, supported actions for the component, API Schema, DSL syntax for the actions, input and output attribute structure for actions, dependencies and discovery mode for the component. Hierarchy and category in the service dictionary schema allows for the classification of various services such as cloud service providers, cloud platform, PaaS service providers, PaaS platform, storage service providers, storage platform container service providers, container platform and various SaaS services. SaaS services includes monitoring, backup, DR, application performance management, security assessment, log management, notification etc. Security definition in the service dictionary schema allows to define authentication attributes and its mechanism required for establishing the API connectivity. Component groups and component in the service dictionary schema can define the hierarchy of the resources which are being offered in the service along with its characteristics, capability and actions. API schema in the service dictionary schema allows to define open API specification stub along with a custom definition for mapping the hierarchy and components for the API, supported by the service. DSL syntax in service dictionary schema allows to define the characteristics of various DSL Engines, its resource definition, parameters and data inputs. Examples can include, inter alia, Cloud platforms such as Openstack®, Cloudstack®, Onapp®, vCloud®, vCente®r, Azurestack®, etc in its schema. Cloud Service Providers can include inter alia, Amazon Web Services®, Microsoft Azure®, Google Compute Engine®, Oracle Cloud®, Centurylink Cloud®, IBM Bluemix®, Openstack®, Cloudstack®, Onapp®, vCloud®, vCenter®, Azurestack® etc, in its schema. Example PaaS Platform can include, inter alia, Openshift®, Cloudfoundry®, etc. Example PaaS Platform can include, inter alia, PaaS Service providers such as Heroku®, Engineyard®, Redhat Openshift®, IBM Bluemix®, etc. The service dictionary can include the central intelligence for Discovery, DSL Validations, DSL Visualizer, DSL Generation and DSL Translation.

DSL Executor 508 executes the DSL along with the input values in the respective cloud platforms. DSL Executor 508 also tracks the execution of the DSL. DSL Executor 508 tracks the chain the execution of the subsequent DSLs. DSL Executor 503 captures the output. DSL Executor 508 passes the output to the next DSLs. This can be based on the definition. DSL Executor 508 tracks the execution of all DSLs. The status of the executions can be updated and maintained by DSL Executor 508.

Example Methods

Figure 6:
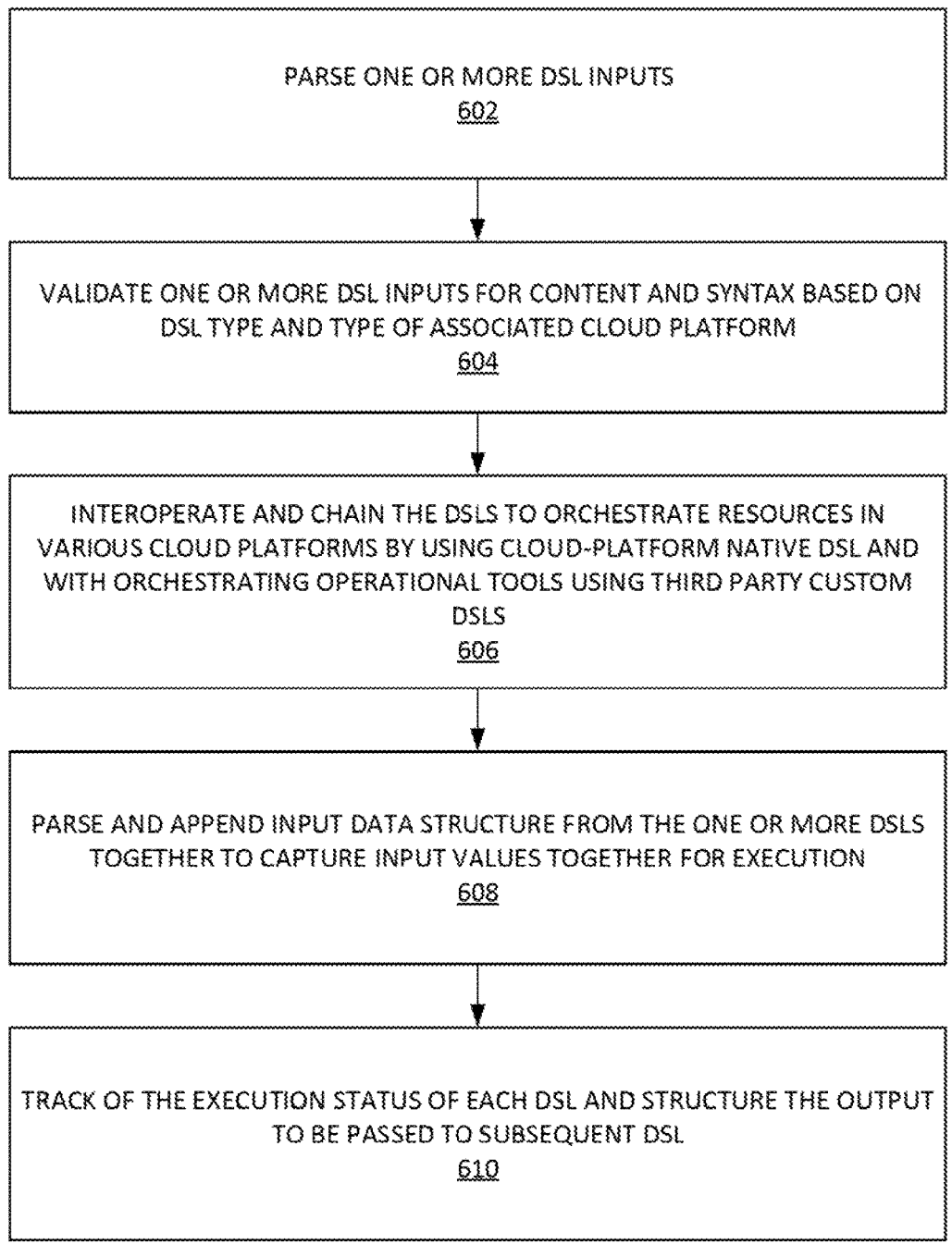
FIG. 6 illustrates an example process for interoperable cloud DSL to orchestrate multiple cloud platforms and services, according to some embodiments.

FIG. 6 illustrates an example process 600 for interoperable cloud DSL to orchestrate multiple cloud platforms and services, according to some embodiments. In step 602, process 600 can parse one or more DSL inputs. In step 604, process 600 can validate one or more DSL inputs for content and syntax based on DSL type and type of associated cloud platform. In step 606, process 600 can interoperate and chain the DSLs to orchestrate resources in various cloud platforms by using cloud-platform native DSL and with orchestrating operational tools using third party custom DSLs. In step 608, process 600 can parse and append input data structure from the one or more DSLs together to capture input values together for execution. An example input data structure 800 is provided in FIG. 8, according to some embodiments. In step 610, process 600 can track of the execution status of each DSL and structure, the output to be passed to subsequent DSL.

Figure 7:
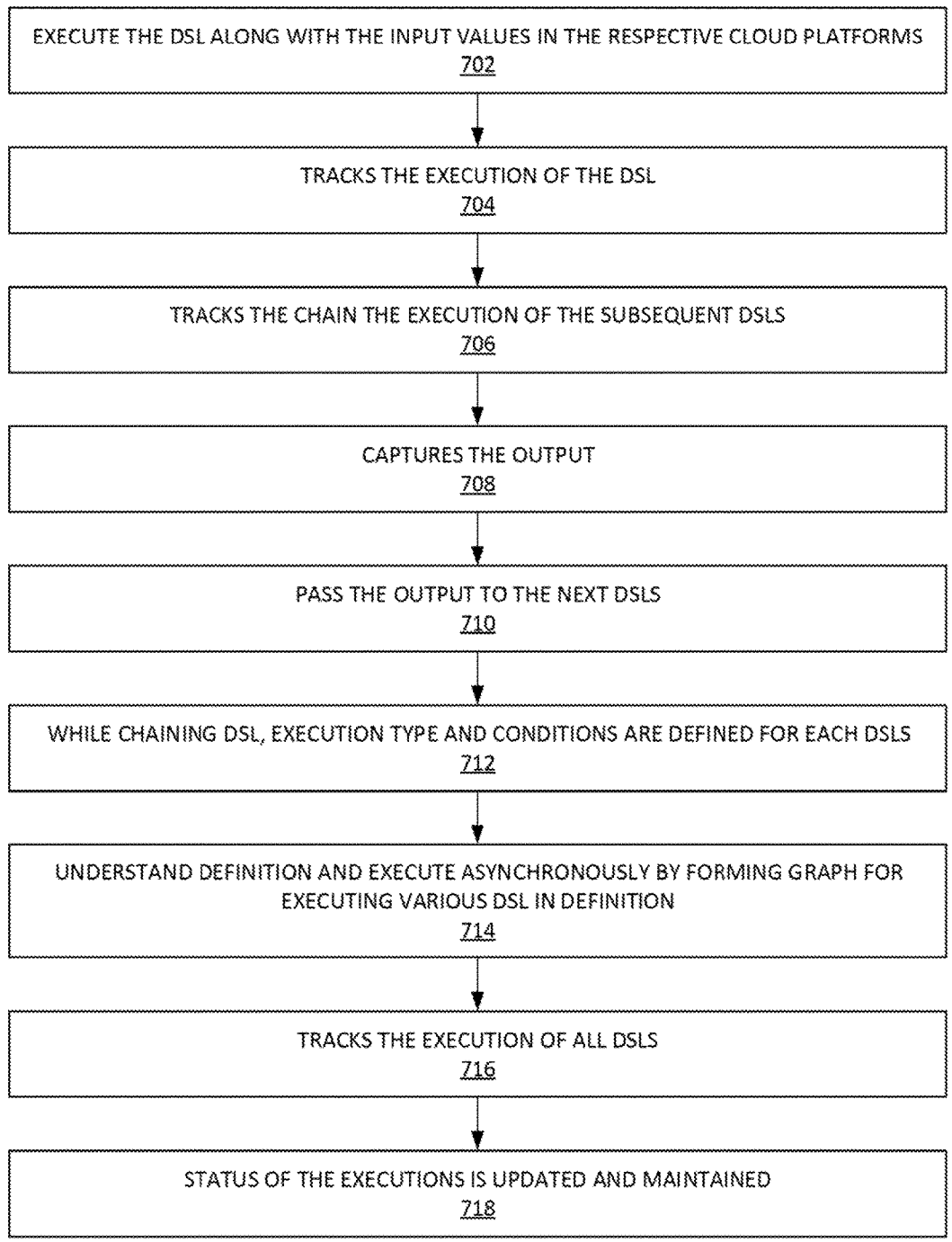
FIG. 7 illustrates an example process of a DSL Executor, according to sortie embodiments.

FIG. 7 illustrates an example process 700 of a DSL Executor (e.g. DSL Executor 508), according, to some embodiments. DSL Executor 508 executes the DSL along with the input values in the respective cloud platforms in step 702. DSL Executor 508 also tracks the execution of the DSL in step 704. DSL Executor 508 tracks the chain the execution of the subsequent DSLs in step 706. DSL Executor 508 captures the output in step 708. DSL Executor 508 can pass the output to the next DSLs in step 710. While chaining the DSL, the execution type (On demand or Scheduled) and conditions are defined for each DSLs in step 712. The execution condition can be based on policy or workflow or events or alarms.

DSL Executor 508 can understand the definition and execute asynchronously by forming a graph for executing various DSL in the definition in step 714. For example, if the execution type for a DSL is schedule, DSL Executor 508 can call the scheduler to schedule the DSL execution as per definition after getting the necessary input required for the DSL. If the execution condition for the DSL is events or alarms, DSL Executor 508 can create a listener which listen for the event or alarm to execute the DSL. If the execution condition is workflow, DSL Executor 508 can create a workflow notification and wait for the approval through a workflow listener. If the execution condition is policy, the DSL Executor creates a policy data source and check the policy data before the execution. A set of chained DSLs can, in turn, contain multiple tasks which gets executed by the respective DSL Engine. DSL Executor 508 tracks the execution of all DSLs in step 716. The status of the executions can be updated and maintained by DSL Executor 508 in step 718.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g. embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in, any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method utilizing an interoperable cloud Domain-specific language (DSL) to orchestrate multiple cloud platforms and services comprising:

parsing one or more DSL inputs;
validating one or more DSL inputs a content and a syntax based on a DSL type and a type of associated cloud platform;
chaining the one or more DSL inputs to orchestrate resources in a plurality of cloud platforms by using a cloud-platform native DSL and with a set of orchestrating operational tools using a set of third party custom DSLs, wherein the one or more DSL inputs are chained utilizing an anatomy of DSL/Templates, wherein the DSLs/Templates anatomy comprises:
an input section that defines a set parameters used for performing actions on the resources of the input attributes,
a resource section that defines a set of actions on the resources, and wherein the resource section define any dependencies on other resources, and
an output section that defines a set of output parameters that are resulted through any resource actions;
parsing an input data structure from the one or more DSLs together; and
appending the input data structure from the one or more DSLs together to capture input vales together for execution.

2. The computerized method of claim 1 further comprising:
tracking of the execution status of each DSL and structure the output to be passed to subsequent DSL.

3. The computerized method of claim 1, wherein the interoperable cloud DSL comprises a computer language specialized to a specified application domain.

4. A computer system of interoperable cloud Domain-specific language (DSL) to orchestrate multiple cloud platforms and services comprising:
a processor;
a memory containing instructions when executed on the processors causes the processor to perform operations that:
parse one or more DSL inputs;
validate one or more DSL inputs a content and a syntax based on a DSL type and a type of associated cloud platform;
chain the one or more DSL to orchestrate resources in various cloud platforms by using cloud-platform native DSL and with orchestrating operational tools using third party custom DSLs, wherein the one or more DSL inputs are chained utilizing an anatomy of DSL/Templates, wherein the DSLs/Templates anatomy comprises:
an input section that defines a set parameters used for performing actions on the resources of the input attributes,
a resource section that defines a set of actions on the resources, and wherein the resource section define any dependencies on other resources, and
an output section that defines a set of output parameters that are resulted through any resource actions;
parse an input data structure from the one or more DSLs together; and
append the input data structure from the one or more DSLs together to capture input values together for execution.

5. The computer system of claim 4, wherein the interoperable cloud DSL comprises a computer language specialized to a specified application domain.

6. The computer system of claim 5, wherein the memory containing instructions when executed on the processor, causes the processor to perform operations that:
track of the execution status of each DSL and structure the output to be passed to subsequent DSL.

7. A computerized method of a Domain-specific language (DSL) Executor comprising:
executing a DSL along with a set of input values in a set of one or more respective cloud platforms;
asking the execution of the DSL;
wherein the DSL executor:
track a chain of an execution of a set of subsequent DSLs;
a DSL Executor captures an output from the chain of the execution a set of subsequent DSLs;
the DSL Executor passes the output to a set of next DSLs;
while chaining the DSL, generating a definition based on an execution type and a condition for each DSL in a set of subsequent DSLs, wherein the one or more DSLs are chained utilizing an anatomy of DSL/Templates, wherein the DSLs/Templates anatomy comprises:
an input section that defines a set parameters used for performing actions on the resources of the input attributes,
a resource section that defines a set of actions on the resources, and wherein the resource section define any dependencies on other resources, and
an output section that defines a set of output parameters that are resulted through any resource actions;
based on the definition of the DSL definition, generating a graph for asynchronously executing any DSL in the definition;
updating a status of an execution of the set of subsequent DSLs.

8. The computerized method of claim 7, wherein the execution type comprises an on-demand execution type.

9. The computerized method of claim 7, wherein the execution type comprises a scheduled execution type.

* * * * *